United States Patent [19]

Oosake et al.

[11] 4,134,675

[45] Jan. 16, 1979

[54] FILM POSITIONING MECHANISM FOR A MICROFILM CAMERA

[75] Inventors: Shigenori Oosake; Makoto Murakoshi; Tsuneo Komura, all of Asaka, Japan

[73] Assignee: Fuji Photo Film Co., Ltd., Kanagawa, Japan

[21] Appl. No.: 811,355

[22] Filed: Jun. 29, 1977

[30] Foreign Application Priority Data

Jul. 1, 1976 [JP] Japan .................................. 51-77016

[51] Int. Cl.$^2$ ............................................. G03B 27/44
[52] U.S. Cl. ....................................... 355/54; 354/124; 355/75
[58] Field of Search ...................... 355/53, 54, 75, 99; 354/124

[56] References Cited

U.S. PATENT DOCUMENTS

| | | | |
|---|---|---|---|
| 3,746,444 | 7/1973 | Kahle et al. ........................... | 355/54 |
| 3,767,302 | 10/1973 | Roberts et al. ...................... | 355/54 X |
| 3,994,581 | 11/1976 | Hopkins et al. ....................... | 355/54 |
| 4,037,955 | 7/1977 | Jamieson et al. ...................... | 355/54 |

*Primary Examiner*—Richard A. Wintercorn
*Attorney, Agent, or Firm*—Sughrue, Rothwell, Mion, Zinn and Macpeak

[57] ABSTRACT

A film positioning mechanism for a microfilm camera includes a movable platen 12 mounting a rotary shaft member 19, 22 and brake means 23, 28 for selectively locking the shaft member against rotation. When the brake means is engaged, a film strip held to the platen by vacuum pressure is advanced along with the platen by a drive motor 14, whereas when the brake means is disengaged from the shaft member and the platen is arrested by a stop pin 31 or 31', a film driving roller 25 is driven by the motor 14 via the shaft member and a belt 24, thereby advancing the film while the platen remains stationary. Thus, a single motor both feeds the film and moves the platen. The mechanism can operate in both a roll-to-roll mode and a roll-to-sheet mode, the latter employing a film cutter 49, 50.

6 Claims, 4 Drawing Figures

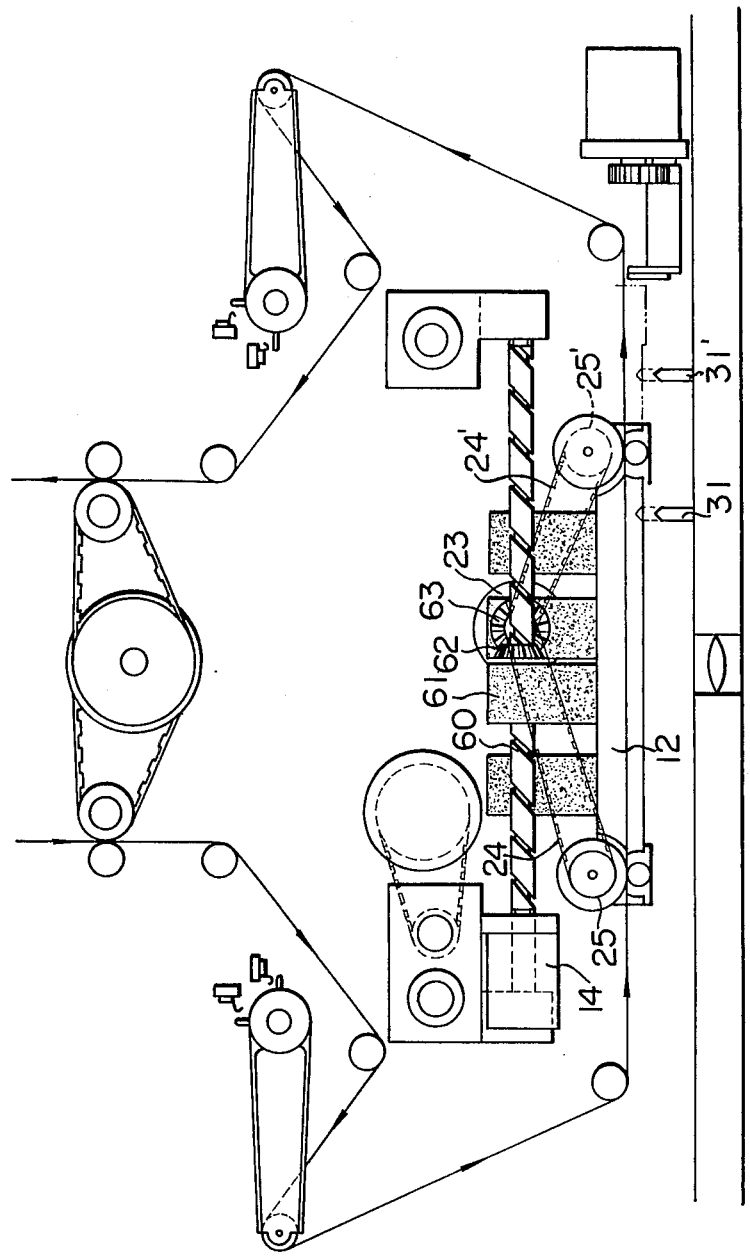

FILM POSITIONING MECHANISM FOR A MICROFILM CAMERA

BACKGROUND OF THE INVENTION

1. Field of the Invention

The present invention relates to a film locating device for a microfilm camera which can be used for both roll-to-roll and roll-to-sheet systems.

2. Description of the Prior Art

In microfilming, information is recorded in small areas at high density by extremely fine images. In a microfilm camera for photographing information in such a fine area on the film, the photographic optical system is fixed, and it it thus important to position the film with high accuracy at a predetermined location with respect to the optical system. Further, in a 105 mm film, the information is recorded in several frames in the width direction, and the film must thus be moved in two directions. There is a microfilm camera called COM (computer output microfilmer) in which a computer output is recorded as a micro-image on the film. The computer output may be obtained directly from the computer, or it may be obtained indirectly from a magnetic tape after storage therein. In the former case, the computer output signal is converted into a CRT image and optically recorded directly on a film, or converted into modulated laser beams or electronic beams which are irradiated directly on the film by means of a two dimensional scanner and recorded as a microimage. The computer output has an extremely high speed, and it is therefore necessary to effect recording at a high speed in order to make good use of the computer time. To this end, it is necessary to record each frame at a high speed and at the same time to move or advance the film at a high speed between frames. Moreover, since the image frames are small and closely spaced, it is necessary to locate the film with high accuracy.

Various microfilm cameras are currently commercially available, but none of them are capable of functioning in both a roll-to-roll mode (in which the film roll is kept in its roll after exposure) and a roll-to-sheet mode (in which the film roll is formed into a sheet after exposure). In a COM, such a dual-mode camera is particularly needed. At present, a typical COM camera of the roll-to-roll type is disclosed in Japanese Patent Publication No. 14266/1974 filed by Terminal Data Corporation. In this camera a platen is moved in one direction and a film is fed in the other direction to locate the film. The platen can both hold and move the film. When this camera is used in a roll-to-sheet mode, however, several disadvantages are involved. First, since the tip of the film is moved on the platen, chips of film sometimes adhere to the surface of the platen which damages the film. Second, since the platen is moved in a condition where the tip of the film is not supported while projecting from the platen, the projecting portion of the film sometimes impinges upon other members to injure or damage the film. Further, since the film is fed by a drive roller only at the point where the film enters the platen, it is difficult to accurately locate the film.

A typical roll-to-sheet mode camera is disclosed in Japanese Patent Publication (OPI) No. 63722/1973. In this camera a magazine encasing an unused film roll is fixed on the platen, and the platen is moved in two directions to locate the film. After exposure, the tip of the film is gripped and pulled out to sever one sheet portion by a cutter. When this camera is used in a roll-to-roll mode, however, several disadvantages are involved. First, since the magazine is moved together with the platen, a large magazine cannot be used which limits the film length. Second, since the film must be passed through the cutter and film extracting mechanism, it is difficult to set the film. Third, since the film guide plate of the platen and the film extracting mechanism are limied to a 105 mm film, 16 mm and 35 mm films cannot be used.

Thus, the prior art roll-to-roll and roll-to-sheet mode cameras cannot be used interchangeably, which limits their adaptability.

SUMMARY OF THE INVENTION

It is therefore an object of the present invention to provide a microfilm camera which is effectively operable in both a roll-to-roll and a roll-to-sheet mode.

The invention provides a film locating device in a microfilm camera having a platen for holding and moving a film to a predetermined position, said platen comprising a rotary member engaged with a rotating and transmitting member driven by a motor fixed externally of said platen, and a member for blocking the rotation of said rotary member. When the rotation of the rotary member is blocked, the film is moved in an advancing direction with the platen by rotation of the motor, whereas when the rotation of the rotary member is not blocked, a film driving roller engaged with the rotary member is rotated by the motor to move the film in the advancing direction. The invention further provides a film locating device in which the platen is movable at right angles to the direction of movement of the film. Thus, the invention has a film advancig mechanism which functions differently in a roll-to-roll mode and in a roll-to-sheet mode. In the former case, the film is continuous so that it is advanced without moving the platen, and in the latter case where the film is discontinuous or cut, the platen is moved in the advancing direction. A single motor is used to both feed the film and to move the platen.

BRIEF DESCRIPTION OF THE DRAWINGS

In the drawings:

FIGS. 2 and 4 are schematic elevations to assist in explaining the movement of the film, taken along lines A—A of FIGS. 1 and 3, respectively.

DETAILED DESCRIPTION OF THE PREFERRED EMBODIMENTS

Figure 1:
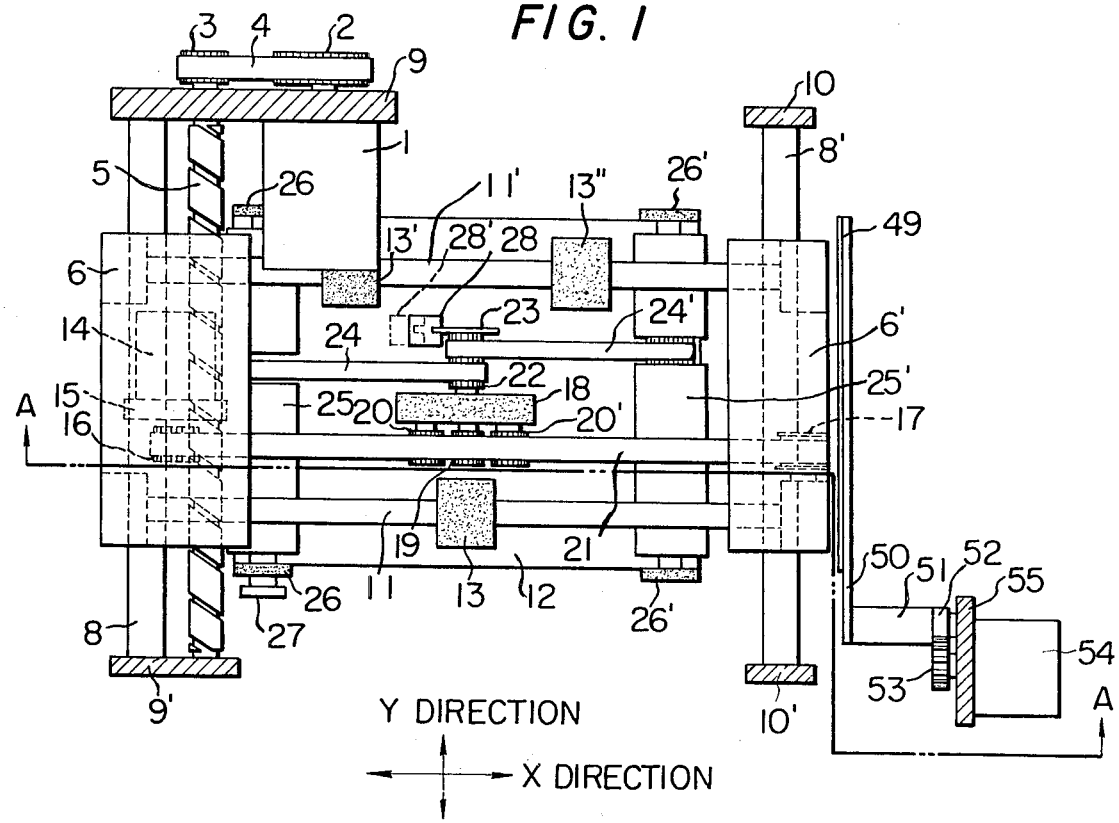
FIGS. 1 and 3 are plan views of the platen portions of film locating devices in accordance with two embodiments of the present invention.
Figure 2:
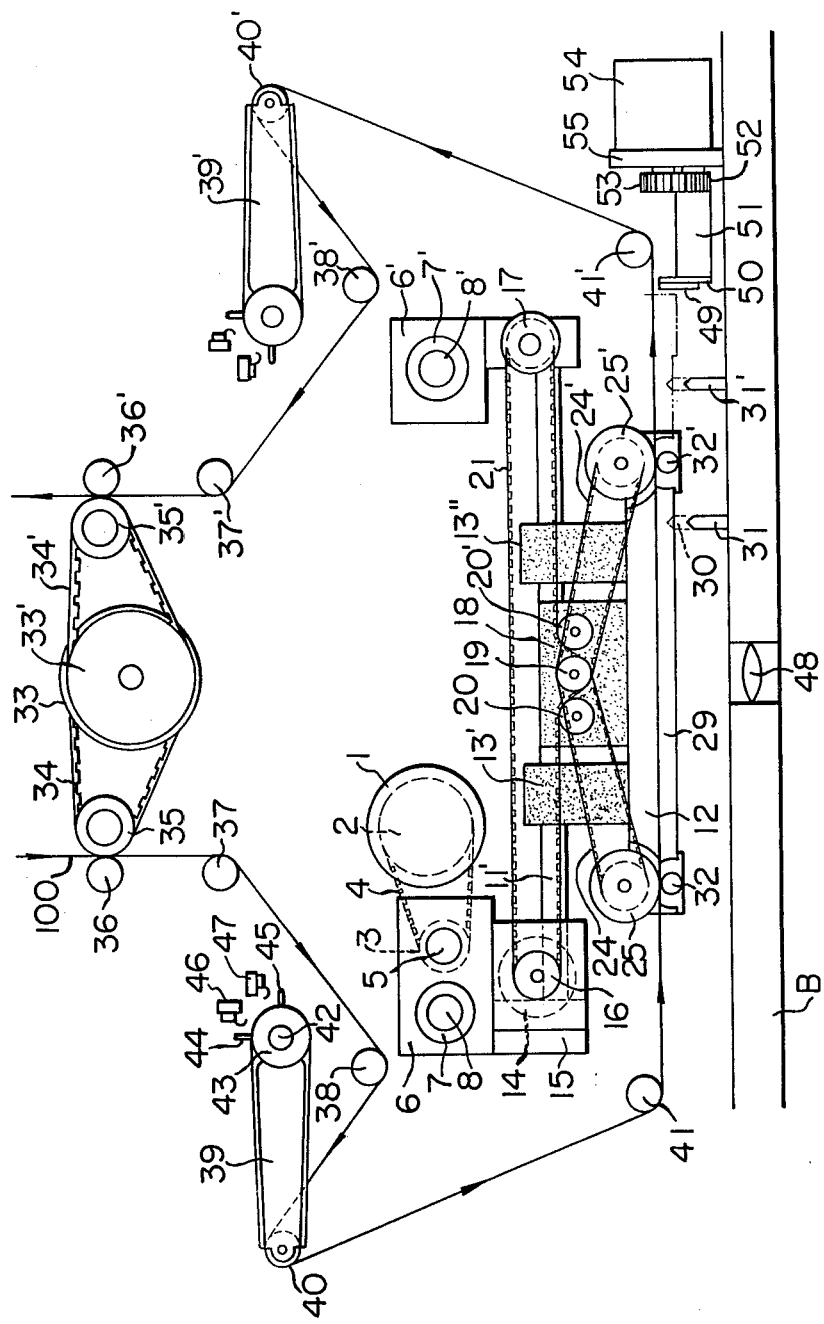

Referring now to the embodiment shown in FIGS. 1 and 2, film 100 is transported in the direction shown by the arrows in FIG. 2, and is exposed at a position above a lens 48. The stippled members are secured to a platen 12, and the oblique lined members are secured to a base plate B of the camera. The platen moves above the base plate and in two directions in a plane parallel to the base plate.

The primed reference characters designate parts having substantially the same function as those designated by the corresponding unprimed reference characters.

The platen moves in both the X and Y directions, shown in FIG. 1, and the film moves in the X direction.

The movement of the platen in the Y direction will first be described. An electrical signal designating a frame position on the film is applied from an external source, and the film is held by the platen and moved to a predetermined photographic position above the base plate and lens 48 in FIG. 2. The platen holds the film underneath by vacuum pressure or the like.

Reference numeral 1 designates a reversible pulse motor or servo-motor whose controlled rotation is applied to a lead screw 5 by a timing belt 4 stretched between pulleys 2 and 3. A housing 6 engages the lead screw 5 by means of an internal thread, and slides on a guide rod 8 through a bearing 7. A housing 6' located on the right in the figures slides on guide rod 8' through a bearing 7'. The motor 1 is secured to a support plate 9, the lead screw 5 is rotatably journaled in support plates 9 and 9' along with guide rod 8, and guide rod 8' is secured to support plates 10 and 10'. All of these support plates are mounted on the base plate B of the camera.

The housings 6 and 6' are joined together by frame rods 11 and 11', whereby the rotation of the motor 1 causes the housings 6 and 6' to integrally move along the lead screw 5 in the Y direction. Linearity of movement is accurately maintained by the guide rods 8 and 8'. The frame rods 11 and 11' also engage housings 13, 13' and 13" which are mounted on the platen 12, whereby the platen is moved in the Y direction together with the housings 6 and 6' in response to the controlled rotation of the motor 1.

The movement of the platen in the X direction will now be described. Reference numeral 14 designates a reversible pulse motor or servo-motor mounted below the housing 6 on a flange 15 secured to the housing 6 and having a timing pulley 16. A pulley 17 is mounted on the housing 6', and a timing pulley 19 and idle rollers 20, 20' are mounted on a supporting plate 18 secured to the platen 12. A timing belt 21 is passed over the timing pulley 16, pulley 17, timing pulley 19, and idle rollers 20, 20'. A timing pulley 22 is directly coupled to the pulley 19 on the same shaft, and has a friction disc 23 mounted at its one end. The rotation of the timing pulley 22 is transmitted to film feed rollers 25 and 25' through timing belts 24 and 24'. The film feed rollers 25 and 25' are journaled on support plates 26 and 26', respectively, mounted on the platen 12. The film feed roller 25 has a hand-knob 27 attached to the end thereof to manually feed the film into the platen 12 when the film is changed. The friction disc 23 has a disc brake 28 which is released when energized, for a reason described later. When the motor 14 is driven with the friction disc 23 held or clamped by the disc brake 28, the timing belt 21 is moved as the timing pulley 16 rotates, but the timing pulleys 19 and 22 cannot rotate since the friction disc 23 is clamped. As a consequence, since the support plate 18 is fixed to the platen 12, the latter moves linearly along the frame rods 11 and 11' in the X direction as the timing belt 21 moves.

The movement of the film in the X direction will now be described. The platen 12 is designed so that the film is held by vacuum means (not shown), and when the film is to be moved in the X direction the vacuum pressure is released. Film guide plates 29 are replaceably mounted on the underside of the platen 12 on opposite sides thereof whereby various films of different width may be used by selecting appropriate guide plates. The latter prevent the film from moving in the Y direction relative to the platen 12. Stoppers 31 or 31' mounted on the base plate B are inserted into platen stopper holes 30 in the film guide plates 29, the friction disc 23 is unclamped by the disc brake 28, and the motor 14 is energized. The timing pulleys 19 and 22 are thus both rotated, and the film feed rollers 25 and 25' are rotated through the timing belts 24 and 24'. As the film feed rollers rotate, the film 100 pressed between rollers 25, 25' and 32, 32' moves in the X direction. Thus, when the friction disc 23 is unclamped with the platen 12 locked in position, the rotation of the motor 14 drives the film feed rollers 25 and 25' to advance the film 100 in the X direction.

Referring principally to FIG. 2, the film locating operation will now be described, first with respect to a roll-to-roll mode. Reference numerals 33 and 33' at the upper portion of FIG. 2 designate reversible motors, one being connected to a drive roller 35 on the side of a film supply magazine (not shown) through a timing belt 34, and the other being connected to a drive roller 35' on the side of a film take-up magazine (not shown) through a timing belt 34'. The film 100 drawn out of the supply magazine passes between drive roller 35 and a pressure roller 36 in the direction shown by the arrow, and arrives at the platen 12 via pulleys 37 and 38, roller 40 of a sensor arm 39, and pulley 41. The film leaving the platen passes over another pulley 41', roller 40' of a sensor arm 39', pulleys 38' and 37', and enters the nip between drive roller 35' and pressure roller 36'. The members other than rollers 40 and 40' and the platen 12 are fixed in position on the camera case or the like.

In the passage of the film, members having the same function are symmetrically arranged on opposite sides and operate in a similar manner, and hence only the operation on the supply side will be explained. Sensor arm 39 is rotatable about a shaft 42 and has a spring loaded hub 43 biasing the arm clockwise in the figure. This arm 39 provides a lengthened loop of film between the pulleys 38 and 41 so that the film may smoothly follow the movement of the platen in the Y direction. The hub 43 has projections 44 and 45 so that when the arm 39 is rotated upwardly the projection 44 actuates a microswitch 46 which causes the motor 33 to return some of the film to the supply magazine through the drive roller 35. When the arm 39 is downwardly rotated, on the other hand, the projection 45 actuates a microswitch 47 which causes the motor 33 to run in reverse and pull additional film out of the supply magazine. In this manner, the length of the film loop is maintained substantially constant. In the roll-to-roll mode the platen 12 is locked by the stopper 31 in the position shown by the solid lines in FIG. 2, the disc brake is moved to the position shown by the broken lines at 28', and the friction disc 23 is thus unclamped. In this state the platen 12 (and film) is moved by the motor 1 in the Y direction and the film 100 is moved by the motor 14 in the X direction to accurately position a frame of the film, as described above. After the film has been so positioned, a CRT image or the like arranged under the lens 48 is optically recorded on the film, or recordation is effected by a photomodulated laser beam, LED array, or the like. After such recordation or exposure, the film is advanced through and discharged from the platen towards the take-up magazine. If the film guide plates 29 are appropriately selected as previously mentioned, rolls of film having 16 mm, 35 mm and 70 mm widths can easily be accomodated.

The operation of the apparatus in a roll-to-sheet mode will now be described. In this case the stopper 31 is released from the platen 12, and the disc brake is moved to the position shown by the solid line 28 to thus clamp the friction disc 23. In this state the platen 12 is moved by the motor 1 in the Y direction and by the motor 14 in the X direction to accurately locate the next frame of the film. After the film has been so located (repeatedly) and a full sheet portion thereof has been exposed, the platen is moved to the position indicated by the broken lines on the righthand side in FIG. 2, whereat it is locked by the stopper 31', and the disc brake 28 is energized to disengage the friction disc 23. The motor 14 is then driven, whereby the exposed single sheet portion of the film is discharged from the platen by the film feed rollers 25 and 25', and severed by a cutter described later. In such a roll-to-sheet mode the friction disc 23 is unclamped only during the feed-out of the sheet portion of the film, which is very short in duration. This is why the invention employs a disc brake of the type which is released by energization, as described above, rather than vice versa. As sheets are cut from the film strip, the tip or end of the film remains on the platen and never moves relative to the platen, whereby no unsupported end projects from the platen and hence the film is not damaged or broken.

The cutter will now be described. A lower blade 49 is secured to the base plate B of the camera, and an upper blade 50 is connected to a reversible cutter motor 54 through a connecting rod 51 and gears 52 and 53. The motor 54 is mounted on a flange 55 secured to the base plate. This cutter is a scissors-type cutter in which the upper blade 50 is pivotally rotated up and down on the connecting rod 51 by the forward and reverse rotation of the motor 54. In a roll-to-roll mode, since the film is not severed the upper blade 50 is left down as shown in FIG. 2 to avoid contacting the film and to allow smooth changing and advancing of the film. In a roll-to-sheet mode, the upper blade 50 is rotated to its raised position before an exposed sheet portion of the film is fed, and after such feeding the upper blade is rotated down to cut the film.

Figure 3:
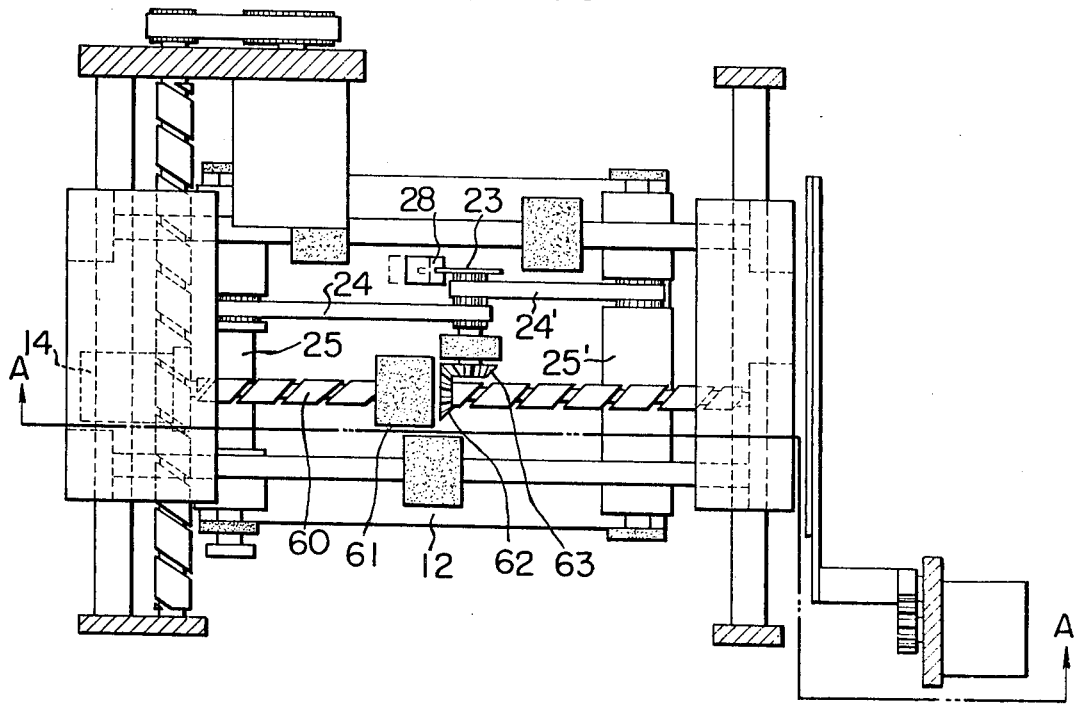

FIGS. 3 and 4 are plan and elevation views, respectively, of a modified form of the invention, generally similar to the embodiment shown in FIGS. 1 and 2. Only those parts different from the first embodiment will therefore be described.

First, the movement of the platen will be described. The friction disc 23 is clamped by the disc brake 28, whereby a lead screw nut 62 having a bevel gear engaged with a matching bevel gear 63 cannot be rotated. The platen 12 is not locked. Accordingly, when a lead screw 60 is rotated by the motor 14, a support plate 61 in which the lead screw nut 62 is rotatably journaled moves in the X direction, and carries with it the platen 12.

To move the film the friction disc 23 is unclamped whereby the lead screw nut 62 is rotatable with the bevel gear 63, and the platen 12 is locked by stopper 31 or 31'. Accordingly, when the lead screw 60 is rotated by the motor 14, the support plate 61 does not move since the platen is locked, the lead screw nut 62 rotates within the support plate 61, and the bevel gear 63 rotates. The film feed rollers 25 and 25' are thus rotated through the timing belts 24 and 24' to advance the film in the X direction.

While the present invention has been described by way of two specific embodiments, various modifications may be made. For example, a spline pole may be engaged with the housing 6 and the motor 14 mounted on the base plate B to thereby reduce the weight of the movable parts. Further, while the direction of movement of the platen 12 by the motor 14 is the same as the film feed direction in the disclosed embodiments, a bevel gear may be used for the timing pulley 22 in the first embodiment and a lead screw nut with a timing pulley may be used for the bevel geared lead screw nut 62 in the second embodiment, and the film feed roller shafts may be disposed at right angles to those of the disclosed embodiments whereby the platen 12 would move at a right angle to the film feed direction. The cutter is not limited to a scissors type, but guillotine or rotary type cutters may also be used. Moreover, the movement in the Y direction may be effected by a wire, a belt or the like instead of using a lead screw.

What is claimed is:

1. A film positioning mechanism for a microfilm camera, comprising:
    (a) a platen movable in a first direction and including means for selectively gripping a strip of film disposed thereon and means for guiding said film strip for movement across the platen in said first direction,
    (b) a rotary member mounted on the platen,
    (c) brake means mounted on the platen for selectively engaging the rotary member,
    (d) reversible rotational drive means mounted externally of the platen and drivingly engaged with the rotary member,
    (e) a film advance roller mounted on the platen in driving engagement with the film strip and in driven engagement with the rotary member, and
    (f) means for selectively locking the platen against movement, whereby when the film strip is gripped, the brake means engaged, and the platen unlocked, the rotational drive means moves the platen and film strip in said first direction via the rotary member mounting, and when the film strip is released, the brake means disengaged, and the platen locked, the rotational drive means moves the film strip across the platen in said first direction via the rotary member and the film advance roller.

2. A film positioning mechanism as defined in claim 1, further comprising means for selectively moving the platen in a second direction perpendicular to said first direction.

3. A film positioning mechanism as defined in claim 2, further comprising a film strip cutter mounted externally of the platen, and wherein the means for selectively locking the platen comprises means for locking it at a first position closely adjacent the cutter or at a second position relatively remote from the cutter.

4. A film positioning mechanism as defined in claim 2, wherein the means for guiding the film strip are selectively interchangeable to accomodate film strips of different widths.

5. A film positioning mechanism as defined in claim 2, wherein the rotary member comprises a shaft journaled in a support member mounted on the platen, a disc mounted on the shaft and engageable with the brake means, a first pulley mounted on the shaft and engaged with the film advance roller via a first drive belt, and a second pulley mounted on the shaft and engaged with the rotational drive means via a second drive belt, the axis of the shaft being perpendicular to said first direction.

6. A film positioning mechanism as defined in claim 2, wherein the rotational drive means comprises a lead screw disposed parallel to said first direction, and the rotary member comprises a shaft disposed perpendicular to said first direction and journaled in a first support member mounted on the platen, a disc mounted on the shaft and engageable with the brake means, a pulley mounted on the shaft and engaged with the film advance roller via a drive belt, a bevel gear mounted on the shaft, a second support member mounted on the platen and having a through-hole through which the lead screw passes, and a lead screw-nut rotatably journaled in the through-hole, threadingly engaged with the lead screw, and having a bevel gear face engaged with said bevel gear.

* * * * *